J. M. FOLLETT.
Grain-Drill.
No. 45,707. Patented Jan. 3, 1865.
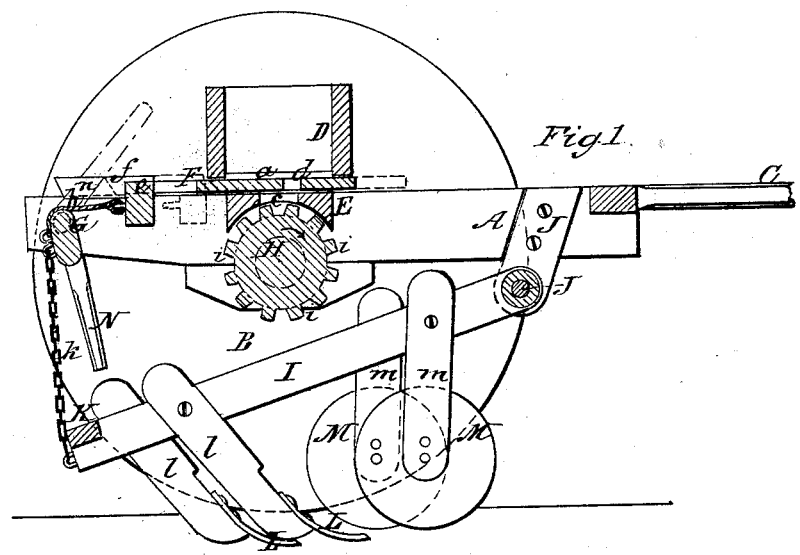
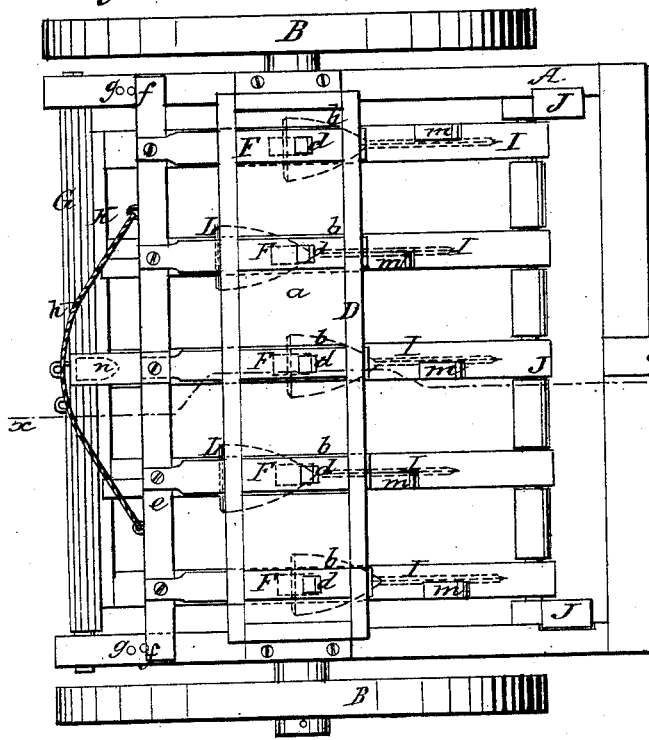
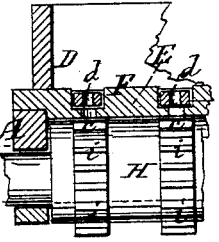
Witnesses:
J. W. Coombs
G. W. Reede
Inventor:
John M. Follett
per Munn & Co
attys.

UNITED STATES PATENT OFFICE.

JOHN M. FOLLETT, OF ATKINSON, ILLINOIS.

IMPROVEMENT IN SEEDING-MACHINES.

Specification forming part of Letters Patent No. 45,707, dated January 3, 1865; antedated May 14, 1862.

*To all whom it may concern:*

Be it known that I, JOHN M. FOLLETT, of Atkinson, in the county of Henry and State of Illinois, have invented a new and Improved Combination of Plow and Seeding-Machine; and I do hereby declare that the following is a full, clear, and exact description of the same, reference being had to the accompanying drawings, making a part of this specification, in which—

Figure 1 is a side sectional view of my invention, taken in the line $xx$ of Fig. 2; Fig. 2, a plan or top view of the same, and Fig. 3 a vertical section of a portion of the hopper and seed-distributing device.

The object of this invention is to obtain a machine of simple construction that will be capable of sowing seeds of various kinds, and at the same time prepare the ground properly to receive it, the seed-stopper, slides, and plows being so connected that the distribution of the seed may be stopped and the plows elevated simultaneously by a simple manipulation of the attendant or driver.

To enable those skilled in the art to fully understand and construct my invention, I will proceed to describe it.

A represents a rectangular frame, which is mounted on two wheels, B B, and has a draft-pole, C, at its front end.

D is a seed-box, which is placed on the frame A and extends its whole width. This seed-box has its bottom $a$ provided with rectangular slots or openings $b$, which extend from its front to its back end, and are at suitable distances apart.

Directly beneath the bottom $a$ of the seed-box there is secured a concave block, E, which has holes $c$ made through it in line with the slots or openings $b$ of the bottom $a$ of the hopper, and in each slot or opening $b$ there is fitted a slide, F. These slides are each perforated with a hole, $d$, and the back ends of the slides are connected to a cross-bar, $e$, the ends of which rest on the side bars of the frame A, and are retained at different points by pins $f$, which fit in any one of a series of holes, $g$, in the side bars of frame A. The bar $e$ has a cord or chain, $h$, attached to it, and this cord or chain is connected to a bar, G, which has its ends fitted in the side pieces of the frame A, so that they may turn freely therein.

Directly below the concave block E there is a cylinder, H, which is on the axle of the wheels B B and connected permanently thereto. This cylinder H has a series of teeth, $i$, placed on it circumferentially and in line with the hole $c$ of the concave block E.

I represents a series of parallel bars, the front ends of which are placed loosely on a shaft, J, which has its bearings in pendants $j$ $j$ at the front part of the frame A. The back ends of the bars I are connected by a traverse-bar, K, and said bar K is connected by a chain, $k$, to the bar G. Each bar I has two oblique bars, $l$ $m$, attached to it. The back bars, $l$, are plow-standards, the lower ends of which project forward and have plows L attached thereto, which plows may be of the usual shovel form. The bars $m$ incline slightly backward at their lower parts, and have each a circular rotating colter, M, fitted in it. There is a colter M directly in front of each plow L.

The operation of the machine is as follows: As the implement is drawn along the colters M cut all stubble or other substances which may lie in their path, while the plows L open the earth and properly prepare it for the seed, which is distributed from the seed-box D by the rotation of the cylinder H, the teeth $i$ serving as conveyers. When the machine is to be used the bar G is so turned that the chain or cord $h$ will draw back the slides F and cause their holes $d$ to register with the holes $c$ of the block E. At the same time the chain $k$ is slackened or let down, and the plows and colters are allowed to penetrate the earth. The bar G has a lever or handle, N, attached to it at right angles, and this lever or handle, when raised or turned up by the operator, strikes against a projection, $n$, on the bar K and throws forward the slides F, so as to cut off the escape of seed from the box D, the chain $k$ at the same time elevating the bars I and the plows and colters which are attached to them. Thus it will be seen that by a single movement of the lever or handle N the seed-distributing device and the plows and colters may be adjusted ready for use, or adjusted so as to be rendered inoperative and the machine be drawn from place to place.

I do not claim the employment or use of circular rotating colters, for they have been previously used; nor do I claim the attaching of plows to an adjustable plow-frame; but I do claim as new and desire to secure by Letters Patent—

The combination of the stopper-slides F, bar G, and plow and colter frame composed of the parallel bars I, with the bars $l\ m$ attached, the slides F and plow and colter frame being connected to the bar G, and all arranged as shown, to operate as set forth.

JOHN M. FOLLETT.

Witnesses:
 WILLIAM FOLLETT,
 ISAAC L. VAIL.